Feb. 5, 1929.
G. A. MITCHELL
1,701,189
CONSTANT SPEED DRIVE
Filed May 18, 1927
2 Sheets-Sheet 1
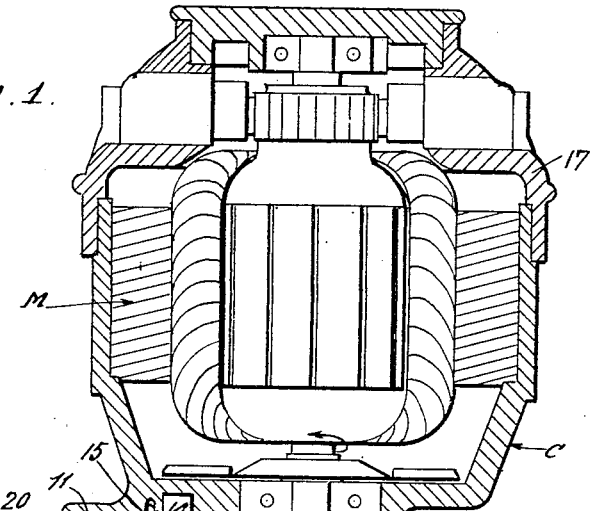
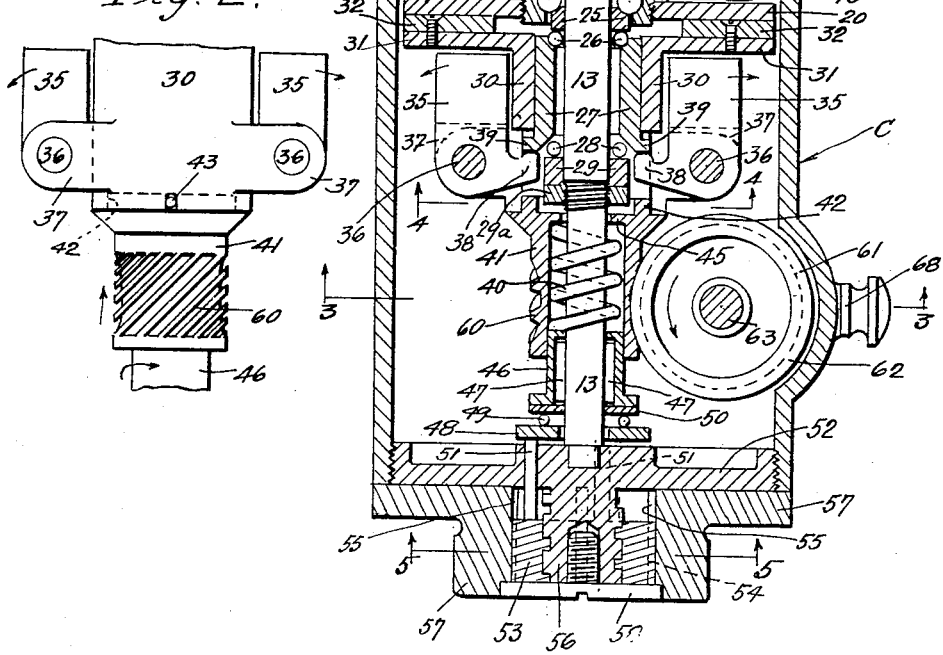
Inventor.
George A. Mitchell.
Attorney.

Feb. 5, 1929.　　　G. A. MITCHELL　　　1,701,189
CONSTANT SPEED DRIVE
Filed May 18, 1927　　　2 Sheets-Sheet 2
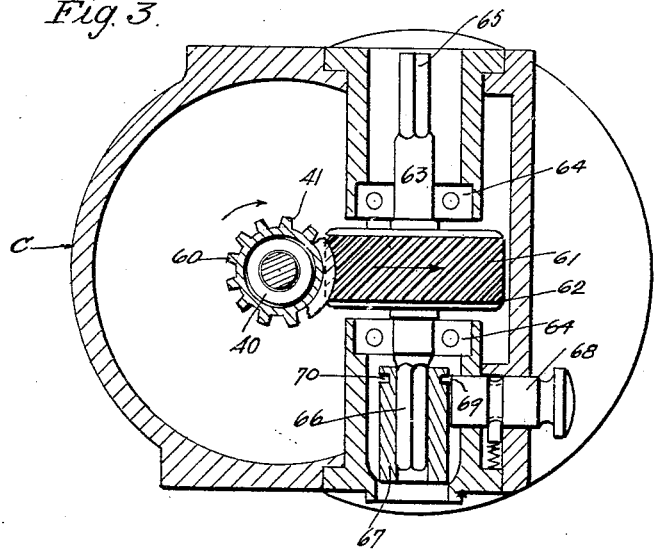
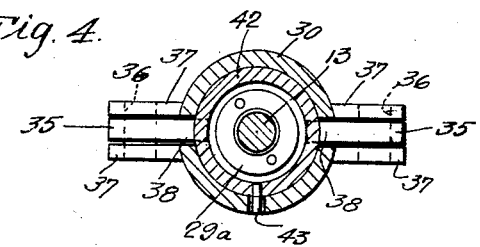
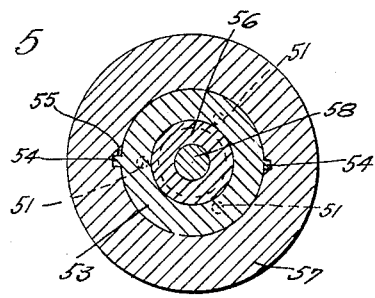
Inventor.
George A. Mitchell
Attorney.

Patented Feb. 5, 1929.

1,701,189

UNITED STATES PATENT OFFICE.

GEORGE A. MITCHELL, OF HUNTINGTON PARK, CALIFORNIA.

CONSTANT-SPEED DRIVE.

Application filed May 18, 1927. Serial No. 192,241.

This invention has reference to driving mechanisms for the purpose of obtaining a constant speed under varying conditions of load or varying conditions of both load and of the initial driving force.

Although a fundamental object of the invention is to provide a simple form of driving mechanism which will give a constant driving speed under such varying conditions, it is also an object to provide for a wide adjustable variation of such constant speed—that is, to provide a mechanism by which variably adjustable speeds can be obtained, but in which, with the mechanism once set at a given speed, that speed will be maintained invariably.

Although my present device is applicable to a wide variety of uses, it can best be illustratively described as applied to the driving of a motion picture camera or projector or the like, without any inferred limitation in that regard. Cameras, for instance, are desired to be driven at various speeds in order to take motion pictures at various numbers of exposures per second. But whatever the selected speed may be it is very important that the driving speed be constant. Whatever the initial driving force may be, a hand crank or an electric motor for instance, there is always a certain variation in its speed which must be compensated. Furthermore the load varies from time to time. For instance, the force necessary to drive a motion picture camera at a given speed varies as the film is unwound from one reel and wound up on another. This and any other variation in the load must also be compensated in order to maintain a constant speed.

My invention accomplishes these things with a simple mechanism, and also provides for a wide range of adjustment. It does this through the use of a frictional driving element controlled both by a speed governor and by a thrust reaction dependent upon and generated by the load itself. How this is accomplished, together with manual variation of the speed, will best be understood in detail from the following description wherein I explain my now preferred form of my invention, reference being had for this purpose to the accompanying drawings, in which:

Fig. 1 is a horizontal longitudinal section showing my complete driving mechanism in combination with an initial motor drive;

Fig. 2 is a plan of certain parts shown in section in Fig. 1;

Fig. 3 is a cross-section on line 3—3 of Fig. 1;

Fig. 4 is a cross-section on line 4—4 of Fig. 1; and

Fig. 5 is a cross-section on line 5—5 of Fig. 1.

In the drawings the initial drive is shown as a motor M, the details of which need not here be considered. Neither need the details of the case C be considered, the case merely forming a suitable support and housing for the various parts. At one end of the motor shaft there is a spur gear 10 meshing with another spur gear 11 which revolves on bearings 12 around a stationary shaft 13. This stationary shaft is set at its end 14 in the case and is preferably held from rotation by a pin 15.

In order easily to disassemble the motor end of the mechanism I use a bearing 16, at the gear end of the motor shaft, larger than spur gear 10; so that when the motor casing cap 17 is removed, the whole motor armature together with its shaft may be moved out endwise, gear 10 passing through the casing opening in which bearing 16 normally sets.

In the specific illustration here given, the ratio between gears 10 and 11 is about 1 to 2; but that is a matter that may be arranged to suit, that ratio being used in the present instance simply on account of the normal speed of the motor and the desired average range of speeds at which the final driven shaft is to be rotated.

Gear 11 carries a friction plate 20, so that the gear and friction plate always rotate together. In the present instance this friction plate is screw-threaded onto the gear, the screw-threads being cut in such direction that the friction plate always tends to screw more tightly onto the gear. In the present arrangement the motor rotates counterclockwise, looking at its gear end, which causes gear 11 and friction plate 20 to rotate clockwise when viewed in the aspect of Fig. 3. The balls 12 which form the bearing for gear 11 run on an annular seat member 25 surrounding stationary shaft 13; and this same seat member 25 forms a seat for the balls 26 which form a bearing for one end of the rotating sleeve 27. Similar balls 28 form a bearing for the other end of sleeve 27; and a seat ring 29 which is set up by a nut 29ª provides a single means for setting up all of the ball bearing seats, as will be readily understood from an inspection of the drawings. With the bearings properly set up friction plate 20 and sleeve 27, although free to revolve, have no appreciable endwise movement.

Mounted around sleeve 27 and movable longitudinally on that sleeve, is a hub 30 which carries plate 31. This plate 31 may itself constitute the other friction plate, but I prefer to provide plate 31 with a facing 32 of some suitable friction substance, as leather, or such as will be hereinafter described. Hub 30 may be mounted slidably upon sleeve 27 in any desired manner; but it is sufficient that it simply be fitted upon the sleeve so that it can slide freely without any looseness. The fact that it may also possibly revolve with reference to sleeve 27 is of no consequence. In practice the rotary friction between hub 30 and sleeve 27 is larger than the rotary friction of sleeve 27 upon its bearings, so that sleeve 27 always rotates with hub 30. Hub 30 carries a set of centrifugal weights 35, here shown as two in number and mounted on pivots 36 which in turn are mounted on lugs or ears 37 projecting from hub 30. These weights have arms 38 which bear against the flanged outer end 39 of sleeve 27. Sleeve 27 being immovable longitudinally, it will be seen that outward motion of the weights under centrifugal force will cause motion of pivots 36, and therefore of hub 30 and friction plate 31, away from friction plate 20.

Friction plate 31 is constantly urged toward friction plate 20 by the action of a spring 40 housed within a gear sleeve 41, which sleeve has an annular end flange 42 fitted within the outer end of hub 30.

The connection of sleeve 41 to hub 30 is a rotary driving connection; and this may be effected either by force fitting sleeve 41 into hub 30, but preferably by fitting the sleeve fairly tightly into the hub and then providing a drive pin 43 as shown in Figs. 2 and 4.

Spring 40 has its seat against a flange 45 at the end of sleeve 41; and it is compressed between this flange and a bearing sleeve 46 which enters the end of sleeve 41. Bearing sleeve 46 contains roller bearings 47 and thus provides a radial bearing for the end of sleeve 41 about shaft 13. This bearing may be moved longitudinally along shaft 13 for the purpose of variably compressing spring 40; and this is done through the medium of a thrust plate 48 and a ball bearing 49 interposed between the thrust plate and a plate 50 at the end of bearing sleeve 46. Thrust plate 48 is rotatably stationary but movable longitudinally of shaft 13. It is provided with a plurality of thrust pins 51 which extend through the stationary casing cap 52 and rest at their outer ends upon the face of a nut 53. Nut 53 rotates about a stationary screw-threaded pin 56 which projects from the face of casing cap 52 so that rotation of the nut will cause its longitudinal movement and thus cause longitudinal movement of thrust pins 51, and cause a variable compression of spring 40. At the outer face of cap 52 there is a rotatable head 57, held against the head by a broad-headed screw 58, this screw also limiting the outward movement of nut 53 and preventing it from dropping out of the head. The nut is rotatable but longitudinally slidably connected with the head by means of splines 54 on the nut which slide in grooves 55 in the head. The head may be suitably calibrated against a mark on the case so that by turning the head any desired compression may be put upon spring 40, thus putting upon friction plate 31 any desired normal pressure toward the friction plate 20.

Gear sleeve 41 has cut in its exterior face a set of helical gear teeth 60 preferably at an angle of 45°. Although this angle may be varied within limits which will give the thrust action which I explain hereinafter, my experience so far is that an angle of 45° has given best results. These gear teeth 60 mesh with the similar helical gear teeth 61 of a gear 62 mounted on the final driven shaft 63, gear teeth 61 also being cut at an angle of 45°. The exact gear ratio between these two gears is of no fundamental consequence in my device. In the specific mechanism here shown gear 41 has 18 teeth and gear 62 has 30 teeth, both cut on right hand spirals.

Final driven shaft 63 is mounted in bearings 64 in the case and has at one end a square 65 to which a hand crank may be attached for rotating the mechanism by hand if desired. It has at the other end a square 66 on which a longitudinally movable sleeve 67 may play, this sleeve 67 forming the disconnectible driving clutch to the squared end of the driving shaft of the mechanism (for instance, a camera) desired to be driven. Sleeve 67 may be moved longitudinally by the rotation of a small rotatable head 68 which has an eccentric pin 69 entering an annular groove 70 in sleeve 67.

The rotational direction of gear 41 is indicated by the arrows in Figs. 2 and 3. Such rotation causes rotation of gear 62 in the direction indicated by the arrows in Figs. 1 and 3. The back thrust of gear 62, due to the load on shaft 63, is in a direction opposite to that indicated by the arrow in Fig. 1; and this back thrust, reacting upon gear 41, tends to move gear 41 longitudinally in the direction indicated by the arrow in Fig. 2—longitudinally toward friction plate 20. Thus the back thrust transmitted through the gears tends to move gear 41 and friction plate 31 connected thereto toward friction plate 20; and this back thrust, at any given driving speed, varies directly and proportionately with the load imposed upon final driven shaft 63. Consequently the pressure of friction facing 32 on friction plate 20 is automatically varied directly with variations in the load on shaft 63, and with the correct selection of material for the friction face, the friction between the two friction faces is also varied, within the range of action of the mechanism, directly and proportionately as the load on shaft 63 varies.

While various substances may be used for the friction faces, I find it desirable to use certain selected substances which will give a uniform frictional effect at varying relative speeds and throughout long continued use. While two metal friction faces, properly lubricated, might be very readily used, the difficulties of keeping the two metal faces uniformly lubricated at all times and under varying conditions of pressure have led me to utilize other combinations. It is desirable to use lubricated faces in order to prevent changes in frictional effect due to heating; and in order to obtain constant and uniform lubrication I find it most effective to use one metal face and another face of a material such as can be impregnated with a lubricant. For instance I have found that the use of steel or other metal, and a facing 32 of graphited fiber have given very good results; but so far my best results have been obtained by using a metal plate 20, preferably of fairly hard steel, and a facing 32 made of leather saturated with Lanum (wool grease). Using such friction surfaces I have found that the mechanism here described is capable of giving a substantially absolutely uniform final driving speed within an adjustable range (at final driven shaft 63) of from two revolutions per second to 28 revolutions per second. These specific figures are based on the gear ratios hereinbefore stated and on the use of a driving motor which runs at about 3000 R. P. M. With different initial motor speeds and with different gear ratios it will readily be seen that different final ranges of speed may be obtained; but, whatever the average R. P. M. may be, the mechanism is capable of adjustment through a widely varying range of speed, and of giving throughout that range a substantially unvarying final driving speed, even though the initial driving motor may vary widely in speed and though the load on the driven shaft may also vary widely and comparatively quickly.

The operation of the mechanism will be readily understood from what precedes. The spring 40 having been set at any selected degree of compression, the friction surfaces are thereby held together under a corresponding pressure. At a certain corresponding rotary speed of the speed governor weights 35, centrifugal force will be sufficient to move plate 31 back against the pressure of spring 40, thus reducing the pressure of the friction faces. The action of the centrifugal weights is therefore to keep constant the rotary speed of gear 41 regardless of variations in speed of driving motor M. Superimposed upon this speed control is the load thrust control before explained; the pressure between the frictional surfaces varying directly with variations in the load, thereby increasing or decreasing the frictionally transmitted driving force just in proportion as the load torque increases or decreases. This combined speed and load controlled action takes place at any speed for which the mechanism is set.

I claim:

1. In combination with a driving shaft and a driven shaft, a friction clutch between the two shafts embodying two frictional contacting elements one of which is movable relatively to and from the other, a speed controlled device adapted to move the movable element, and means for exerting a thrust upon said movable element proportional to the load torque of the driven shaft, said means embodying a pair of intermeshing spiral gears, one connected to the driven shaft, the other connected to said movable element and adapted to actuate the movable element by movement therewith.

2. In combination with a driving shaft and a driven shaft, a friction clutch between the two shafts embodying two frictional contacting elements one of which is movable relatively to and from the other, a speed controlled device adapted to move the movable element, means for exerting a thrust upon said movable element proportional to the load torque on the driven shaft, said means embodying a pair of intermeshing spiral gears, one connected to the driven shaft, the other connected to said movable element and adapted to actuate the movable element by movement therewith, and adjustable means for exerting a constant thrust on the movable element to move it into contact with the other element.

3. In combination with a driving shaft and a driven shaft, a friction clutch between the two shafts embodying two frictional contacting elements one of which is movable relatively to and from the other, a speed controlled device adapted to move the movable element, means for exerting a thrust upon said movable element proportional to the load torque of the driven shaft, said means embodying a pair of intermeshing spiral gears one connected to the driven shaft and the other to said movable element, and adjustable means for exerting a constant thrust on the movable element to move it into contact with the other element.

4. In combination with a driving shaft and a driven shaft, a rotating friction plate rotatively connected with the driving shaft, a driven friction plate movable axially to and from the driving friction plate, adjustable means for imposing on the driven friction plate a thrust toward the driving friction plate, speed controlled means acting to move the driven friction plate away from the driving friction plate, and a pair of intermeshing helical gears one connected to the driven shaft and the other connected with the driven friction plate to rotate therewith and move longitudinally therewith.

5. In combination with a driving shaft and a driven shaft, a rotating friction plate rotatively connected with the driving shaft, a driven friction plate movable axially to and from the driving friction plate, adjustable means for imposing on the driven friction plate a thrust toward the driving friction plate, speed controlled means acting to move the driven friction plate away from the driving friction plate, and a pair of intermeshing helical gears one connected to the driven shaft and the other connected with the driven friction plate to rotate therewith and move longitudinally therewith, the tooth angle of said gears being approximately 45°.

6. In combination, a frame, a shaft therein, a driving friction plate rotatable and longitudinally immovable on the shaft, a sleeve rotatable and longitudinally immovable on the shaft, a driven friction plate with a hub mounted around said sleeve and longitudinally movable thereon, centrifugal governor weights pivoted to said hub and having arms bearing against said sleeve, said weights being arranged to move the driven friction plate away from the driving friction plate when the centrifugal weights move out under centrifugal action, a gear sleeve affixed to the hub and rotating and moving longitudinally therewith, a compression spring surrounding the stationary shaft and seating at one end against the gear sleeve, a bearing sleeve having a rotary bearing upon the stationary shaft and extending into the gear sleeve and bearing against said compression spring, a rotatable stationary thrust plate exerting longitudinal thrust against said bearing sleeve, means to move said thrust plate longitudinally of the shaft to vary the compression of the spring, spiral gear teeth in said gear sleeve, a driven shaft, and a spiral gear on said driven shaft meshing with the spiral teeth on said gear sleeve.

7. In combination, a frame, a shaft therein, a driving friction plate rotatable and longitudinally immovable on the shaft, a sleeve rotatable and longitudinally immovable on the shaft, a driven friction plate with a hub mounted around said sleeve and longitudinally movable thereon, centrifugal governor weights pivoted to said hub and having arms bearing against said sleeve, said weights being arranged to move the driven friction plate away from the driving friction plate when the centrifugal weights move out under centrifugal action, a gear sleeve affixed to the hub and rotating and moving longitudinally therewith, a compression spring surrounding the stationary shaft and seating at one end against the gear sleeve, a bearing sleeve having a rotary bearing upon the stationary shaft and extending into the gear sleeve and bearing against said compression spring, a rotatably stationary thrust plate exerting longitudinal thrust against said bearing sleeve, means to move said thrust plate longitudinally of the shaft to vary the compression of the spring, spiral gear teeth in said gear sleeve, a driven shaft, and a spiral gear on said driven shaft meshing with the spiral teeth on said gear sleeve, the angle of said spiral gear teeth being approximately 45°.

8. In combination, a frame, a shaft therein, a driving friction plate rotatable and longitudinally immovable on the shaft, a sleeve rotatable and longitudinally immovable on the shaft, a driven friction plate with a hub mounted around said sleeve and longitudinally movable thereon, centrifugal governor weights pivoted to said hub and having arms bearing against said sleeve, said weights being arranged to move the driven friction plate away from the driving friction plate when the centrifugal weights move out under centrifugal action, a gear sleeve affixed to the hub and rotating and moving longitudinally therewith, a compression spring surrounding the stationary shaft and seating at one end against the gear sleeve, a bearing sleeve having a rotary bearing upon the stationary shaft and extending into the gear sleeve and bearing against said compression spring, a rotatably stationary thrust plate exerting longitudinal thrust against said bearing sleeve, means to move said thrust plate longitudinally of the shaft to vary the compression of the spring, said means embodying a stationary screw, a nut meshing with said screw, a rotatable head, rotative connective means between the head and nut allowing relative longitudinal motion of the nut, and members transmitting the longitudinal movement of the nut to said thrust plate, spiral gear teeth in said gear sleeve, a driven shaft, and a spiral gear on said driven shaft meshing with the spiral teeth on said gear sleeve.

9. In a device of the character described, a shaft, a driving friction plate rotatable and longitudinally immovably mounted on said shaft, a sleeve rotatable and longitudinally immovable upon said shaft, a driven friction plate with a hub mounted upon said sleeve to be longitudinally movable thereon, centrifugal governor weights pivotally mounted upon said hub and having arms bearing upon said sleeve, a gear sleeve mounted upon said hub and rotating and moving longitudinally therewith, said gear sleeve also surrounding said stationary shaft, and means for exerting upon said gear sleeve a longitudinal thrust tending to move the gear sleeve, the hub and its driven friction plate toward the driving friction plate.

10. In a device of the character described, the combination of a casing, a driving friction plate and a driven friction plate movable to and from the driving friction plate, both plates located inside said casing, means for imposing an adjustable thrust on the driven friction plate, embodying a spring, a stationary head for said casing, a thrust plate, a thrust pin connected with the thrust plate and extending through the casing head, a stationary threaded pin on the outside of the head, a nut threaded upon said pin and contacting with said thrust pin, and a rotatable head mounted on the outside of the casing head and rotatably connected with the nut.

11. In combination with a driving shaft and a driven shaft, a friction clutch between the two shafts embodying two frictional contacting elements one of which is movable relatively to and from the other, a speed controlled device adapted to move the movable element, and means for exerting a thrust upon said movable element proportional to the load torque of the driven shaft, said means embodying a pair of intermeshing spiral gears one connected to the driven shaft, the other connected to said movable element and movable therewith and adapted to move said element by virtue of the end thrust generated in the spiral gears.

12. In combination with a driving shaft and a driven shaft, a friction clutch between the two shafts embodying two frictional contacting elements one of which is movable relatively to and from the other, a speed controlled device adapted to move the movable element, means for exerting a thrust upon said movable element proportional to the load torque on the driven shaft, said means embodying a pair of intermeshing spiral gears, the first connected to the driven shaft, the second gear connected to said movable element and adapted to actuate the movable element by movement therewith, and adjustable means for pressing upon the second gear to exert a constant thrust on the movable element to move it into contact with the other element.

In witness that I claim the foregoing I have hereunto subscribed my name this 11 day of May, 1927.

GEORGE A. MITCHELL.